(No Model.)
J. P. JACKSON.
APPLIANCE FOR FILTERING WATER AND OTHER LIQUIDS.
No. 337,584. Patented Mar. 9, 1886.
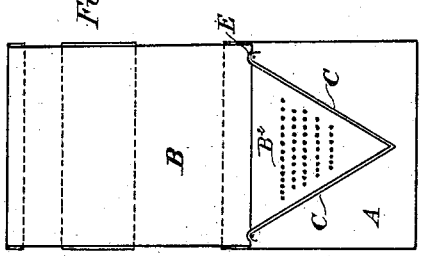
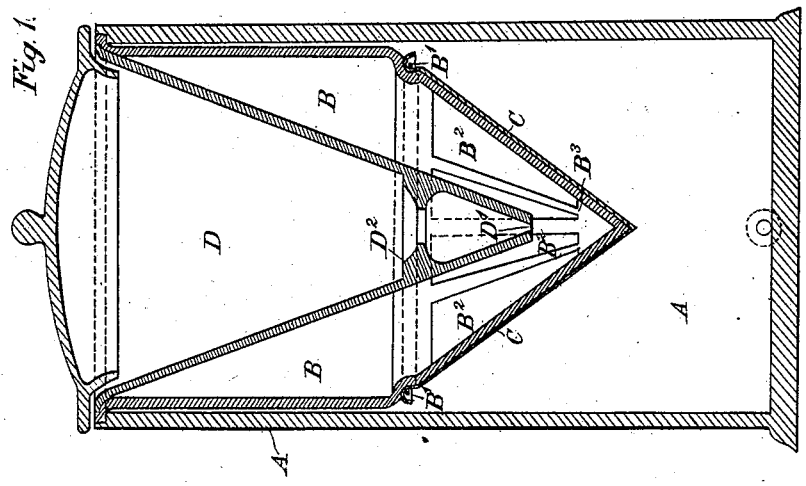
Witnesses
Edward E. Ellis
A. Leo Duffy.
Inventor:
John Perkins Jackson
by Duffy & Onnie
Attorneys.

UNITED STATES PATENT OFFICE.

JOHN PERKINS JACKSON, OF LIVERPOOL, ENGLAND.

APPLIANCE FOR FILTERING WATER AND OTHER LIQUIDS.

SPECIFICATION forming part of Letters Patent No. 337,584, dated March 9, 1886.

Application filed May 21, 1884. Serial No. 132,276. (No model.)

*To all whom it may concern:*

Be it known that I, JOHN PERKINS JACKSON, a subject of the Queen of England, residing at Liverpool, England, wine-merchants' engineer, have invented new and useful Improvements in Appliances for Filtering Water and other Liquids, of which the following is a specification.

My invention relates to a filtering apparatus, and has for its object to provide an improved device of this class which shall be effective and durable in use and cheap to manufacture; and it consists in certain details of construction and modifications thereof, which will be more fully described hereinafter in the specification hereunto annexed, and the points of novelty will be particularly described, and pointed out in the claims hereto appended.

Referring to the accompanying drawings, Figure 1 is a vertical section of the complete device. Fig. 2 is a vertical section of the modified form of the device which is adapted to be used as a pocket-filter. Fig. 3 is a plan view of Fig. 2.

Like letters of reference indicate corresponding parts in all the figures.

A represents the outer casing of the filter; B, the inner cone-shaped casing or chamber, tapering at its lower end and having a groove, B', around it, into which is secured a bag, C, of asbestus cloth or equivalent material. This chamber is provided with the openings B² at B³ in its conical end, but which do not extend clear to the point, so as to leave a small portion through which the liquid cannot pass.

By reference to Fig. 2 it will be observed that perforations can be substituted for the openings B²; but I prefer to use the former in a large filter and the latter in the pocket device.

Within the chamber or casing B is suspended the supplemental chamber D, which hangs inside thereof and opens into chamber B through the aperture D', and also is provided with the diaphragm or inwardly-projecting plate D², the object of which is to check the impetus of the water after it has been poured into said chamber through the top, and thereby allow it to run slowly through the aperture D'.

The filter is prepared for use by pouring water mixed with charcoal or any carbonaceous material into the chamber D, and it is impeded in its descent by the diaphragm, and runs slowly down through opening D' into chamber B, and the point h thereof, being a solid wall, causes the mass to rise up around a and permeate the asbestus cloth in the openings before mentioned, which do not extend either to the top or bottom. The water then percolates through the asbestus down into chamber A, leaving the said meshes of cloth filled with the carbonaceous matter.

Where the liquid is very foul, the chamber D may be dispensed with, and a portion of B filled with coarse granulated charcoal or its equivalent.

The casings A B D may be made of suitable earthenware or glass of the required size.

Figs. 2 and 3 show the filter arranged for the pocket, the construction and action being similar to that of Fig. 1, with the exception of having different-sized perforations in chamber B, and having the plate E to keep the granulated charcoal within the chamber B.

Having thus described my invention, what I claim as new, and desire to secure by Letters Patent, is—

1. A filtering apparatus consisting of the outside body or casing, A, the chamber B, having a conical end, and a groove, B', around it, into which is secured a bag or cloth of asbestus, for the purpose described, and said chamber being provided with the openings B², which extend to near the bottom and top of the conical end, and the chamber D, having diaphragm D² and opening D', as set forth.

2. In a filtering apparatus, the combination of chamber B, having a conical end and openings B², extending to near the top and bottom of said end, and provided with groove B', into which is secured the asbestus cloth, with the chamber A, as set forth.

3. The combination of conical chamber D, having diaphragm D² and opening D', chamber B, provided with a conical end and having openings B² and groove B', and the asbestus cloth secured in said groove, with chamber A, as set forth.

In testimony whereof I have hereto set my hand in the presence of two subscribing witnesses.

JOHN PERKINS JACKSON.

Witnesses:
 ALFRED J. BOULT,
 BERNHARD DUKES.